US009302249B2

(12) United States Patent
Yuan et al.

(10) Patent No.: US 9,302,249 B2
(45) Date of Patent: Apr. 5, 2016

(54) METHOD FOR PREPARING COMPOSITE SULFUR-MODIFIED POWDERED ACTIVATED CARBON

(71) Applicant: NATIONAL SUN YAT-SEN UNIVERSITY, Kaohsiung (TW)

(72) Inventors: Chung-Shin Yuan, Kaohsiung (TW); Iau-Ren Ie, Kaohsiung (TW); Huazhen Shen, Kaohsiung (TW)

(73) Assignee: NATIONAL SUN YAT-SEN UNIVERSITY, Kaohsiung (TW)

( * ) Notice: Subject to any disclaimer, the term of this patent is extended or adjusted under 35 U.S.C. 154(b) by 0 days.

(21) Appl. No.: 14/459,568

(22) Filed: Aug. 14, 2014

(65) Prior Publication Data

US 2015/0051062 A1     Feb. 19, 2015

(30) Foreign Application Priority Data

Aug. 15, 2013  (TW) .............................. 102129224 A

(51) Int. Cl.
| | |
|---|---|
| *C01B 31/08* | (2006.01) |
| *B01J 20/32* | (2006.01) |
| *B01J 20/02* | (2006.01) |
| *B01J 20/20* | (2006.01) |

(52) U.S. Cl.
CPC ............ *B01J 20/324* (2013.01); *B01J 20/0266* (2013.01); *B01J 20/20* (2013.01); *C01B 31/083* (2013.01)

(58) Field of Classification Search
CPC ...... C01B 31/083; B01J 20/0266; B01J 20/20
See application file for complete search history.

(56) References Cited

U.S. PATENT DOCUMENTS 4,500,327 A * 2/1985 Nishino ................. B01D 53/02
502/406

FOREIGN PATENT DOCUMENTS

| CN | 102179234 A | 9/2011 |
|---|---|---|
| TW | 574139 | 2/2004 |
| WO | WO2012030560 A1 | 3/2012 |

OTHER PUBLICATIONS

English Abstract of TW574139.
Office Action and the Search Report issued on Mar. 25, 2015 by TIPO for the corresponding TW Patent Application No. 102129224.
English translation of the Search Report issued on Mar. 25, 2015 by TIPO for the corresponding TW Patent Application No. 102129224.
Wei-Chin Chen, Application of Thermogravimetric Analysis (TGA) Technique on Adsorption Capacity and Adsorption and Desorption Kinetics of Sulfur-impregenated Activated Carbon Saturated with Gaseous Mercury, National Sun Yat-sen University, Department of Environmental Engineering, Doctoral Dissertation, Jul. 19, 2011.
Kuei-Ju Lin, Influence of Sulfur Impregnation on the Carbonaceous and Non-carbonaceous Adsorbents for Mercury Removal from Caol Combustion Flue Gase, National Kaohsiung First University of Science and Technology, Department of Safety, Health and Environmental Engineering, Master Thesis, Mar. 12, 2010.

* cited by examiner

*Primary Examiner* — Stuart Hendrickson
(74) *Attorney, Agent, or Firm* — WPAT, P.C.; Anthony King

(57) ABSTRACT

A method for preparing composite sulfur-modified powdered activated carbon includes the following steps: providing a powdered activated carbon; proceeding a drying step on the powdered activated carbon; proceeding a liquid-phase sulfur modification step on the dried powdered activated carbon; proceeding a granulation step, so as to obtain a granular powdered activated carbon from the sulfur-modified powdered activated carbon; and proceeding a vapor-phase elemental sulfur heating step on the granular powdered activated carbon, so as to form the composite sulfur-modified powdered activated carbon.

11 Claims, 2 Drawing Sheets

METHOD FOR PREPARING COMPOSITE SULFUR-MODIFIED POWDERED ACTIVATED CARBON

FIELD

The disclosure relates to a method for preparing powdered activated carbon, more particular to a method for preparing composite sulfur-modified powdered activated carbon.

BACKGROUND

In the municipal waste incineration process, due to high steam pressure, mercury and its derivates (for example, mercuric chloride) are easily evaporated and exhausted with emissions in the high-temperature environment in the incinerator, thereby causing environmental pollution.

Activated carbon is a medium capable of adsorbing organics and heavy metal pollutants. However, since the temperature of the incineration emission is as high as 150° C., the adsorption performance of activated carbon is significantly reduced, so it has been proposed to add other chemicals to modify activated carbon in the prior art, so as to improve the high-temperature adsorption performance of activated carbon.

For example, in a method for preparing sulfur-containing powdered activated carbon disclosed in Taiwan Patent Publication No. 574139, a carbonaceous raw material is subjected to pyrolysis, and a sulfur-containing solution is introduced during the pyrolysis, so as to obtain sulfur-containing powdered activated carbon.

However, the sulfur-containing powdered activated carbon prepared in the method can effectively adsorb divalent mercury, and has limited adsorption effect on elemental mercury having a great threat to human health even in a trace amount.

Therefore, it is necessary to provide a method for preparing composite sulfur-modified powdered activated carbon to solve the foregoing problems.

SUMMARY OF THE INVENTION

In accordance with one aspect of the present disclosure, a method for preparing composite sulfur-modified powdered activated carbon includes the following four steps: providing a powdered activated carbon; proceeding a drying step on the powdered activated carbon; proceeding a liquid-phase sulfur modification step on the dried powdered activated carbon; proceeding a granulation step, so as to obtain a powdered activated carbon from the sulfur-modified powdered activated carbon; and proceeding a vapor-phase elemental sulfur heating step on the granular activated carbon, so as to form the composite sulfur-modified powdered activated carbon.

According to the present disclosure, the powdered activated carbon is first subjected to liquid-phase sulfur modification, and then the powdered activated carbon is subjected to vapor-phase sulfur heating modification, thereby forming the composite sulfur-modified powdered activated carbon. The composite sulfur-modified powdered activated carbon prepared by the present disclosure can effectively simultaneously adsorb elemental mercury and divalent mercury.

BRIEF DESCRIPTION OF THE DRAWINGS

Aspects of the present disclosure are understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION OF THE INVENTION

Figure 1:
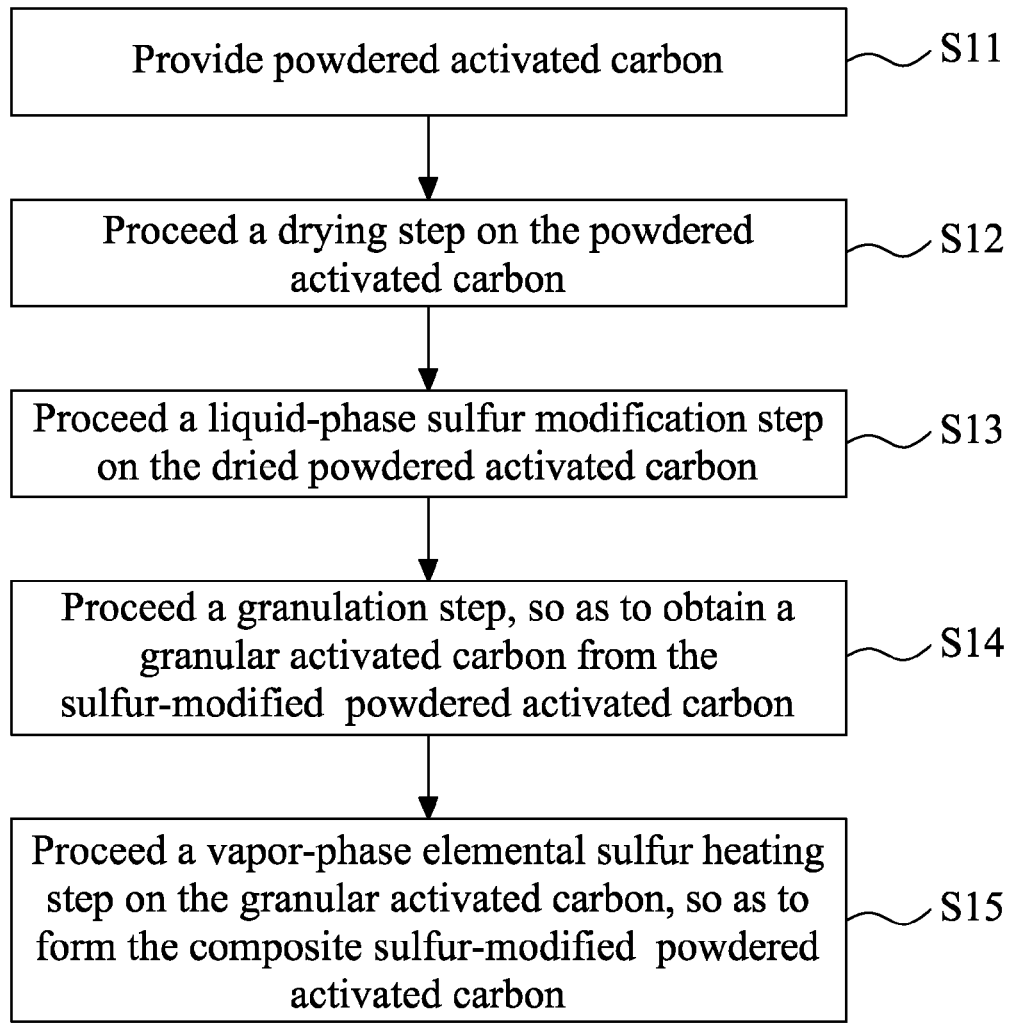
FIG. 1 is a flow chart of a method for preparing composite sulfur-modified powdered activated carbon in accordance with some embodiments of the present disclosure.

It is to be understood that the following disclosure provides many different embodiments or examples, for implementing different features of various embodiments. Specific examples of components and arrangements are described below to simplify the present disclosure. The present disclosure may, however, be embodied in many different forms and should not be construed as being limited to the embodiments set forth herein; rather, these embodiments are provided so that this description will be thorough and complete, and will fully convey the present disclosure to those of ordinary skill in the art. It will be apparent, however, that one or more embodiments may be practiced without these specific details.

In addition, the present disclosure may repeat reference numerals and/or letters in the various examples. This repetition is for the purpose of simplicity and clarity and does not in itself dictate a relationship between the various embodiments and/or configurations discussed.

It will be understood that singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this invention belongs. It will be further understood that terms; such as those defined in commonly used dictionaries, should be interpreted as having a meaning that is consistent with their meaning in the context of the relevant art and the present disclosure, and will not be interpreted in an idealized or overly formal sense unless expressly so defined herein.

FIG. 1 is a flow chart of a method for preparing composite sulfur-modified powdered activated carbon in accordance with some embodiments of the present disclosure. Referring to Step S11 of FIG. 1, a powdered activated carbon is provided. In some embodiments, the powdered activated carbon is obtained through pyrolysis and activation of waste tires.

Referring to Step S12, the powdered activated carbon is subjected to a drying step. Preferably, the drying temperature is 105° C., and the drying time is 24 hours, so as to remove the moisture remained in the inner pores of the activated carbon. In addition, the powdered activated carbon after drying is stored in a dryer, and the temperature in the dryer is maintained at 25° C., and the humidity is lower than 40%.

Referring to Step S13, the dried powdered activated carbon is subjected to a liquid-phase sulfur modification step. In some embodiments, the liquid-phase sulfur modification step includes immersing the dried powdered activated carbon in a sulfur-containing solution. Preferably, the liquid-phase sulfur modification step includes: mixing the powdered activated carbon with the sulfur-containing solution; dispersing the powdered activated carbon uniformly in the sulfur-containing solution by means of ultrasonic agitation; and drying the sulfur-modified powdered activated carbon.

In this step, the sulfur-containing solution is a sodium sulfide ($Na_2S$) solution of a 3% to 5% w/w, which is prepared by dissolving sodium sulfide in deionized water. Preferably, the ratio of the mass of the powdered activated carbon to the volume of the sulfur-containing solution is 1 g:100 ml.

Referring to Step S14, a granulation step is proceeded, so as to obtain powdered activated carbon from the sulfur-modified powdered activated carbon. In some embodiments, the granulation step includes soaking the sulfur-modified powdered activated carbon with deionized water first, and twisting the sulfur-modified powdered activated carbon into powdered activated carbon. Preferably, the granular activated carbon has a particle diameter of 5 mm, so as to achieve optimal contact with elemental sulfur in a vapor-phase reaction.

After the granulation step, the granular activated carbon is placed in a dryer for drying, and preferably, the drying temperature of 25° C., the humidity is maintained lower than 40%, and the drying time is 24 hours. The humidity mm Referring to Step S15, the granular activated carbon is subjected to a vapor-phase elemental sulfur heating step, so as to form a composite sulfur-modified powdered activated carbon. In some embodiments, the vapor-phase elemental sulfur heating step includes the following steps:

the granular activated carbon is mixed with elemental sulfur ($S^0$), so that the surface of the powdered activated carbon is coated with the elemental sulfur ($S^0$), preferably, the mass mixing ratio of the granular activated carbon to the elemental sulfur ($S^0$) is 1:2.6 to 1:3; and the granular activated carbon with the surface coated with the elemental sulfur ($S^0$) is placed in a high-temperature furnace for calcination, and the calcination condition is sharply rising the temperature from normal temperature (25° C.) to 400° C. to 600° C., and maintaining at the temperature for 3 hours, where the calcination process includes continuously feeding nitrogen gas into the high-temperature furnace to serve as the protective gas, and preferably, the volumetric flow rate of nitrogen ($N_2$) fed into the high-temperature furnace ranged from 50 to 80 ml/min. After the calcination step, the resulting product is cooled to room temperature, so as to form the composite sulfur-modified powdered activated carbon.

Figure 2:
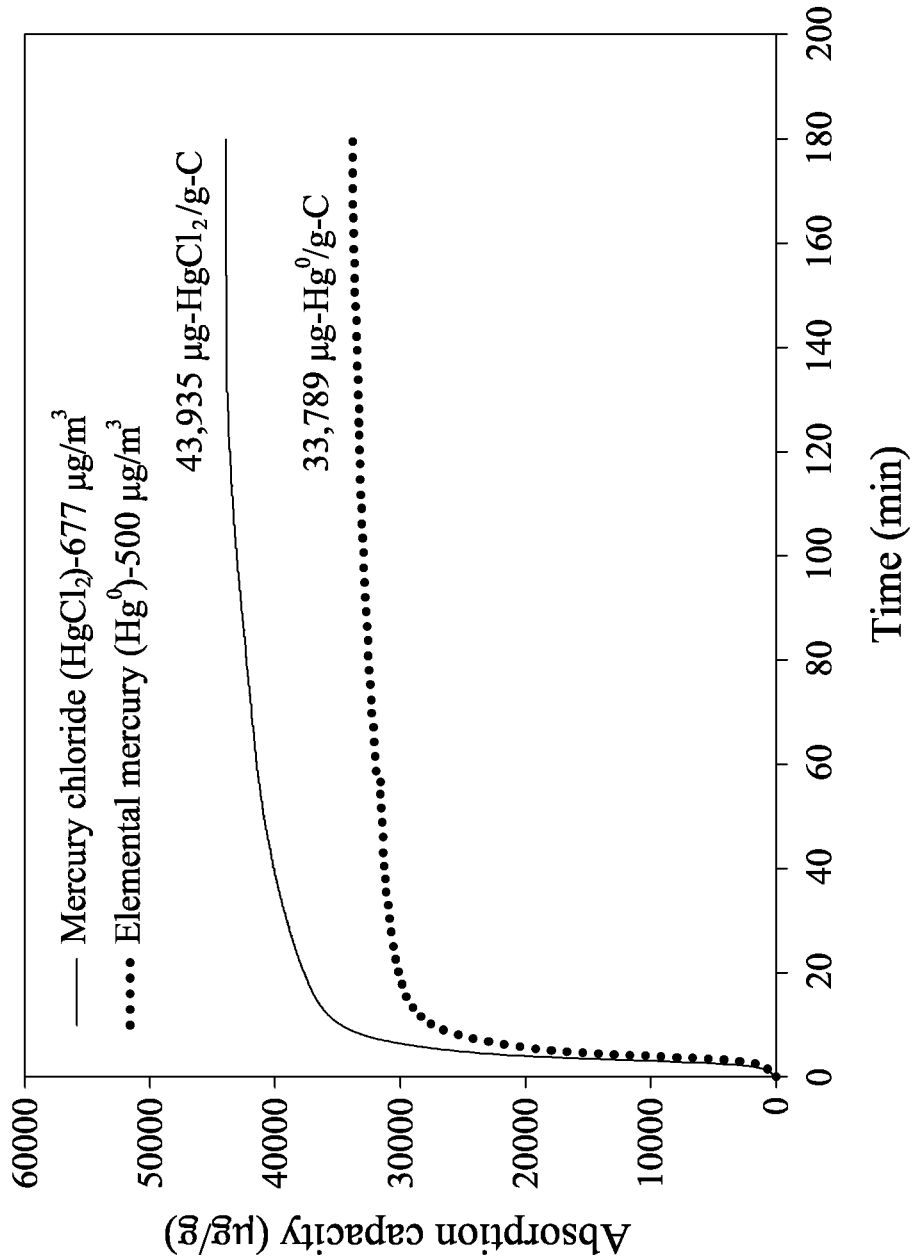
FIG. 2 shows a variation diagram of the adsorption capacity of the composite sulfur-modified powdered activated carbon prepared by the present disclosure on elemental mercury and mercury chloride (divalent mercury).

Referring to FIG. 2, which shows a variation diagram of the adsorption capacity of the composite sulfur-modified powdered activated carbon prepared by the present disclosure on elemental mercury and mercury chloride (divalent mercury). The results of FIG. 2 show that the composite sulfur-modified powdered activated carbon prepared by the present disclosure can effectively adsorbing elemental mercury and mercury chloride (divalent mercury), and the adsorption capacities are respectively as high as 33,759 μg-$Hg^0$/g-C and 43,935 μg-$HgCl_2$/g-C.

Moreover, the scope of the present application is not intended to be limited to the particular embodiments of the process, machine, manufacture, and composition of matter, means, methods and steps described in the specification. As those skilled in the art will readily appreciate form the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure.

Accordingly, the appended claims are intended to include within their scope such processes, machines, manufacture, and compositions of matter, means, methods or steps. In addition, each claim constitutes a separate embodiment, and the combination of various claims and embodiments are within the scope of the invention.

What is claimed is:

1. A method for preparing composite sulfur-modified powdered activated carbon, comprising the following steps:
   (a) providing a powdered activated carbon;
   (b) proceeding a drying step on the powdered activated carbon;
   (c) proceeding a liquid-phase sulfur modification step on the dried powdered activated carbon, wherein the liquid-phase sulfur modification step includes immersing the dried powdered activated carbon in a sulfur-containing solution, and the sulfur-containing solution is a sodium sulfide ($Na_2S$) solution of a mass ratio of 3% to 5%;
   (d) proceeding a granulation step, so as to obtain a granular activated carbon from the sulfur-modified powdered activated carbon; and
   (e) proceeding a heating step on the granular activated carbon, so as to form the composite sulfur-modified powdered activated carbon.

2. The method of claim 1, wherein the drying temperature of Step (b) is 105° C., and the drying time is 24 hours.

3. The method of claim 1, wherein the ratio of the mass of the powdered activated carbon to the volume of the sulfur-containing solution is 1 g:100 ml.

4. The method of claim 1, wherein the liquid-phase sulfur modification step includes:
   (c1) mixing the powdered activated carbon with the sulfur-containing solution;
   (c2) dispersing the powdered activated carbon uniformly in the sulfur-containing solution by means of ultrasonic vibration; and
   (c3) drying the sulfur-modified powdered activated carbon.

5. The method of claim 1, wherein the granulation step of Step (d) includes :
   soaking the sulfur-modified powdered activated carbon with deionized water first; and
   rolling the sulfur-modified powdered activated carbon into granular activated carbon.

6. The method of claim 5, wherein the granular activated carbon has a particle diameter of 5 mm.

7. The method of claim 1, wherein the vapor-phase elemental sulfur heating step of Step (e) includes the following steps:
   (e1) mixing the granular activated carbon with elemental sulfur ($S^0$), so that the surface of the granular activated carbon is coated with the elemental sulfur ($S^0$); and
   (e2) calcining the granular activated carbon with the surface coated with the elemental sulfur ($S^0$) in a high-temperature furnace.

8. The method of claim 7, wherein the mass mixing ratio of the granular activated carbon to the elemental sulfur ($S^0$) is 1:2.6 to 1:3 in Step (e1).

9. The method of claim 7, wherein the calcination condition of Step (e2) is sharply rising the temperature from normal temperature to 400° C. to 600° C., and maintaining at the temperature for 3 hours.

10. The method of claim 7, wherein the calcination process of Step (e2) includes continuously feeding nitrogen gas into the high-temperature furnace to serve as the protective gas.

11. The method of claim 10, wherein the volumetric flow rate of nitrogen ($N_2$) fed into the high-temperature furnace is 50 to 80 ml/min.

* * * * *